(12) United States Patent
Ma

(10) Patent No.: US 11,454,778 B2
(45) Date of Patent: Sep. 27, 2022

(54) LENS MODULE

(71) Applicant: AAC Optics Solutions Pte. Ltd., Singapore (SG)

(72) Inventor: Jie Ma, Shenzhen (CN)

(73) Assignee: AAC Optics Solutions Pte. Ltd., Singapore (SG)

(*) Notice: Subject to any disclaimer, the term of this patent is extended or adjusted under 35 U.S.C. 154(b) by 422 days.

(21) Appl. No.: 16/686,229

(22) Filed: Nov. 18, 2019

(65) Prior Publication Data

US 2020/0162647 A1    May 21, 2020

(30) Foreign Application Priority Data

Nov. 19, 2018  (CN) .......................... 201821910618.1

(51) Int. Cl.
| | |
|---|---|
| *G02B 7/02* | (2021.01) |
| *G02B 7/10* | (2021.01) |
| *H04N 5/225* | (2006.01) |
| *G02B 5/00* | (2006.01) |

(52) U.S. Cl.
CPC ............. *G02B 7/026* (2013.01); *G02B 5/003* (2013.01); *G02B 7/10* (2013.01); *H04N 5/2254* (2013.01); *G02B 7/021* (2013.01)

(58) Field of Classification Search
CPC ........ G02B 5/003–005; G02B 7/00–02; G02B 7/026; G02B 7/10; H04N 5/2254
USPC ................................ 359/738–740, 819, 830
See application file for complete search history.

(56) References Cited

U.S. PATENT DOCUMENTS

| | | | |
|---|---|---|---|
| 2011/0199695 A1* | 8/2011 | Kuwahara .............. | G02B 7/021 359/823 |
| 2018/0129011 A1* | 5/2018 | Tsai ....................... | G02B 7/025 |
| 2018/0239109 A1* | 8/2018 | Chou ..................... | G02B 13/002 |

FOREIGN PATENT DOCUMENTS

CN            107450253 A   * 12/2017

\* cited by examiner

*Primary Examiner* — Mahidere S Sahle
(74) *Attorney, Agent, or Firm* — W&G Law Group

(57) ABSTRACT

The present disclosure discloses a lens module. The lens module includes a lens barrel, a lens, and a pressing ring abutted against the lens from an image side. The pressing ring includes an upper surface close to an object side, a lower surface, an inner connecting surface, and an outer connecting surface. The outer connecting surface is abutted against the lens barrel, the upper surface is provided with a boss extending towards the object side. The lens module provided by the present disclosure can ensure the assembly precision of the pressing ring and improve the yield rate of the lens module.

6 Claims, 2 Drawing Sheets

LENS MODULE

TECHNICAL FIELD

The embodiments of the present disclosure relate to the field of optical imaging technologies, and more particularly to a lens module.

BACKGROUND

With the continuous development of science and technology, electronic devices are continuously developed towards intelligence. In addition to digital cameras, portable electronic devices such as tablet computers and mobile phones are also equipped with lens modules having photographing and image shooting functions, so as to meet the photographing needs of users at any time. The lens module of the related art includes a lens barrel, a lens accommodated in the lens barrel, and a pressing ring abut against the lens from an image side to fix the lens, and an outer diameter of the pressing ring is matched with an inner diameter of the lens barrel.

It has been founded by the inventors that the existing technologies at least have the following problems: the pressing ring has poor roundness due to burrs in the outer diameter of the pressing ring, and is easy to deflect when assembling the pressing ring, and the assembly precision of the pressing ring is not high, resulting in lower yield rate of the lens module.

BRIEF DESCRIPTION OF THE DRAWINGS

One or more embodiments are illustrated by way of example through the figures in the corresponding accompanying drawings, which are not intended to limit the embodiments, and elements having the same reference numerals in the accompanying drawings are illustrated as similar elements. Unless otherwise stated, the figures in the accompanying drawings do not constitute a limitation of ratio.

DETAILED DESCRIPTION

To make the objects, technical solutions, and advantages of the present disclosure clearer, the embodiments of the present disclosure are further described in detail hereinafter with reference to the drawings. However, those of ordinary skills in the art can understand that, in the embodiments of the present disclosure, many technical details are proposed for readers to better understand the present disclosure. However, even without these technical details and various changes and modifications based on the following embodiments, the technical solutions sought to be protected by the present disclosure can also be realized.

Figure 1:
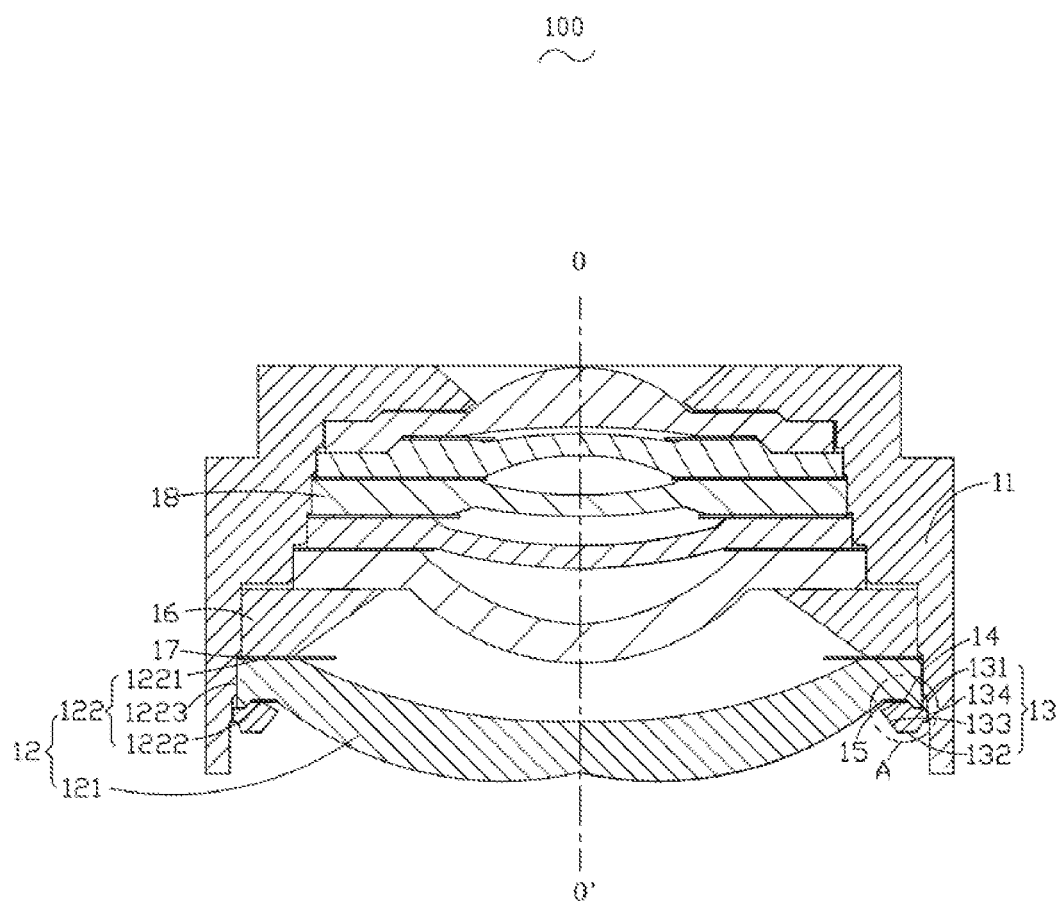
FIG. 1 is a sectional structural view of a lens module provided by a first embodiment of the present disclosure.
Figure 2:
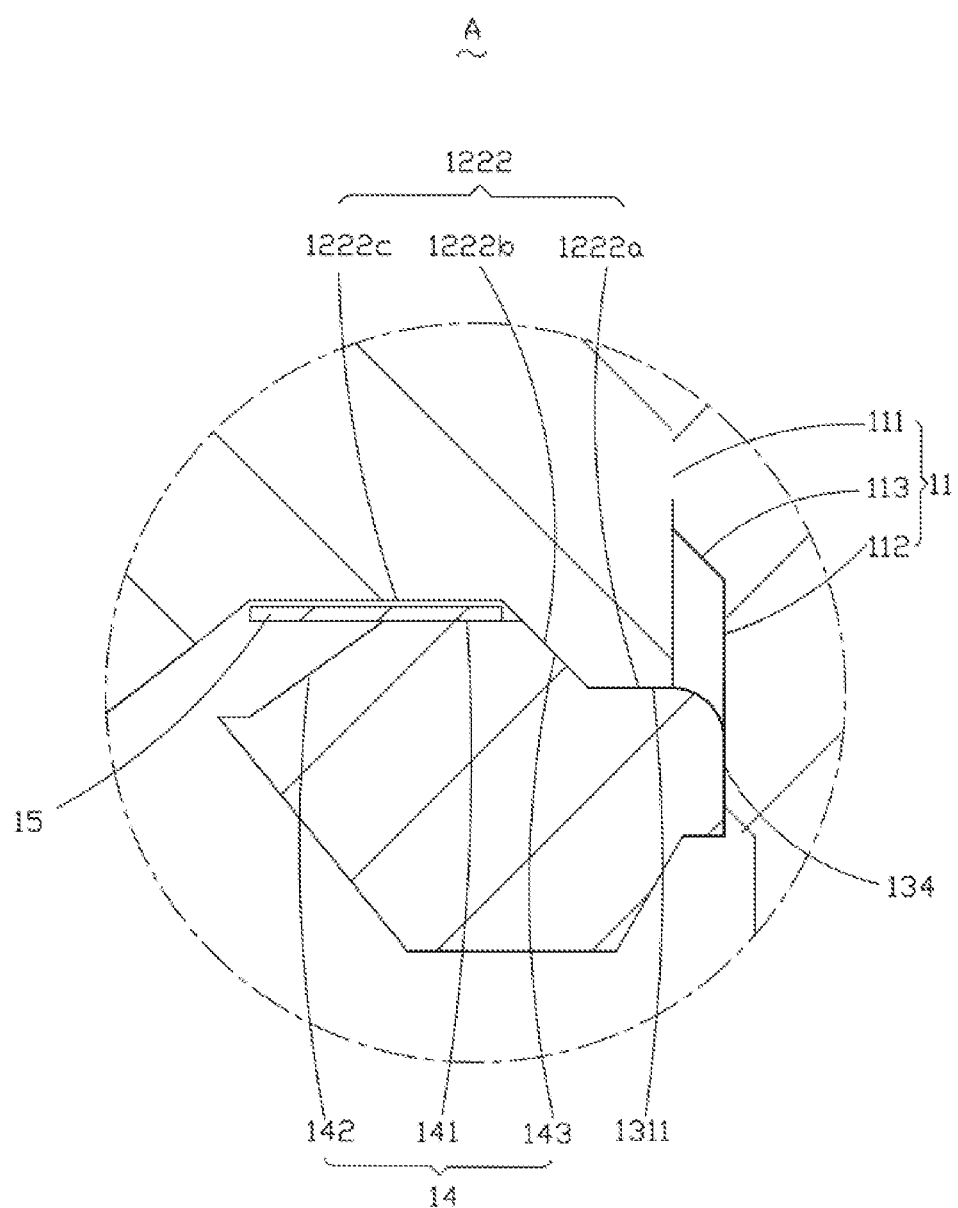
FIG. 2 is a partial enlarged view of portion A in FIG. 1.

The first embodiment of the present disclosure relates to a lens module 100, as shown in FIG. 1 to FIG. 2, including: a lens barrel 11, a lens 12 having an optical axis OO' accommodated in the lens barrel 11, and a pressing ring 13 abutted against the lens 12 from an image side. The pressing ring 13 includes an upper surface 131 close to an object side, a lower surface 132 disposed opposite to the upper surface 131, an inner connecting surface 133 connecting the upper surface 131 and the lower surface 132, and an outer connecting surface 134 opposite to the inner connecting surface 133. The outer connecting surface 134 is abutted against the lens barrel 11. The upper surface 131 is provided with a boss 14 extending towards the object side. The boss 14 includes a top surface 141, a first side surface 142 extending towards the image side from an edge of the top surface 141 close to an optical axis OO' along a direction close to the optical axis OO', and a second side surface 143 extending towards the image side from an edge of the top surface 141 far away from the optical axis OO' along a direction far away from the optical axis OO'. The upper surface 131 includes a first surface 1311 extending from an edge of the second side surface 143 far away from the optical axis OO' towards the direction far away from the optical axis OO'. The first surface 1311 and the second side surface 143 are abutted against the lens 12, and the top surface 141 is spaced apart from the lens 12.

Comparing the embodiments of the present disclosure with the existing technologies, since the first surface 1311 and the second side surface 143 are abutted against the lens 12, components vertical to the optical axis OO' and towards the optical axis OO' exist in the acting force of the lens 12 on the pressing ring 13, that is, a bumpy-ridge structure is formed, so that the pressing ring 13 does not need to be matched with the lens barrel 11 through the outer diameter, thus avoiding the problem that the pressing ring 13 is easy to deflect when assembling the pressing ring 13 due to burrs in the outer diameter of the pressing ring 13, ensuring the assembly precision of the pressing ring 13, and improving the yield rate of the lens module 100. Moreover, since the second side surface 143 extends toward the image side from the edge of the top surface 141 far away from the optical axis OO' along the direction far away from the optical axis OO', the second side surface 143 can also play a role of guiding when assembling the pressing ring 13 into the lens barrel 11, thus further improving the assembly precision of the pressing ring 13 and the yield rate of the lens module 100; moreover, an edge thickness of the lens 12 is increased, which can increase a sprue of the lens 12, and is beneficial for molding the lens 12.

In the embodiment, the pressing ring 13 is made of plastics, and the upper surface 131 is smoothly connected in transition with the outer connecting surface 134. The lens 12 made by plastics (hereinafter referred as plastic lens 12) is light in weight, easy to process and convenient to transport; is not easy to break, has less broken fragments, is not sharp, and has higher safety. The plastic lens 12 has strong anti-fogging property, thus improving the imaging quality of the lens module 100. The plastic lens 12 can prevent dents. Generally, high-heat and small-volume substances are easy to cause dents and spots on a glass sheet. However, when touching the plastic lens 12, the plastic lens 12 will automatically bounce off without causing any marks on the surface of the lens 12, thus prolonging the service life of the lens module 100.

Specifically, the lens 12 includes an optical portion 121 and a bearing portion 122 disposed around the optical portion 121. The bearing portion 122 includes an object-side surface 1221 close to the object side, an image-side surface 1222 disposed opposite to the object-side surface 1221, and a peripheral surface 1223 connecting the object-side surface 1221 and the image-side surface 1222. The lens barrel 11 includes a first abutting surface 111 abutted against the peripheral surface 1223, a second abutting surface 112 abutted against the outer connecting surface 134, and an extending surface 113 connecting the first abutting surface 111 and the second abutting surface 112. The extending surface 113 extends from the first abutting surface 111 towards the direction far away from the optical axis OO'. The image-side surface 1222 includes a second surface 1222*a* extending from an edge of the peripheral surface 1223 towards the direction close to the optical axis OO', a third surface 1222*b* extending from an edge of the second surface 1222*a* far away from the peripheral surface 1223 towards the object side along the direction close to the optical axis OO', and a fourth surface 1222*c* extending from an edge of the third surface 1222*b* close to the object side towards the direction close to the optical axis OO'. The first surface 1311 is abutted against the second surface 1222*a*, the second side surface 143 is abutted against the third surface 1222*b*, and the top surface 141 is spaced apart from the fourth surface 1222*c*.

Optionally, the top surface 141 and the fourth surface 1222*c* are vertical to the optical axis OO', one end of the fourth surface 1222*c* far away from the third surface 1222*b* is connected with the optical portion 121, and the first side surface 142 is spaced apart from the lens 12.

It is worth mentioning that a first shade 15 is disposed between the pressing ring 13 and the lens 12, the top surface 141 is abutted against the first shade 15 from the image side, and the fourth surface 1222*c* is abutted against the first shade 15 from the object side. Such arrangement can better prevent false light from entering the lens barrel 11, thereby improving the imaging quality of the lens module 100.

In the embodiment, the lens module 100 further includes a shielding plate 16 disposed at the object side of the lens 12. Such arrangement can reduce false light entering the lens barrel 11, thereby improving the imaging quality of the lens barrel 11. Optionally, a second shade 17 is disposed between the lens 12 and the shielding plate 16, thereby further emitting false light and improving the imaging quality of the lens module 100.

Specifically, the lens module 100 further includes a lens group 18 disposed at an object side of the shielding plate 16. The lens group 18 includes at least five lenses stacked from the object side towards the image side, and the lens group 18 is abutted against the lens barrel 11 from the image side. The shade may also be disposed between the lenses.

Those of ordinary skills in the art can understand that the above embodiments are specific embodiments for implementing the present disclosure, and in practical applications, various changes in form and detail can be made to the embodiments without departing from the scope of the present disclosure.

What is claimed is:

1. A lens module, comprising:
a lens barrel,
a lens having an optical axis accommodated in the lens barrel, and
a pressing ring abutted against the lens from an image side;
wherein the pressing ring comprises an upper surface close to an object side, a lower surface disposed opposite to the upper surface, an inner connecting surface connecting the upper surface and the lower surface, and an outer connecting surface opposite to the inner connecting surface;
the outer connecting surface is abutted against the lens barrel,
the upper surface is provided with a boss extending towards the object side,
the boss comprises a top surface, a first side surface extending towards the image side from an edge of the top surface close to an optical axis along a direction close to the optical axis, and a second side surface extending towards the image side from an edge of the top surface far away from the optical axis along a direction far away from the optical axis;
the upper surface comprises a first surface extending from an edge of the second side surface far away from the optical axis towards the direction far away from the optical axis,
the first surface and the second side surface are abutted against the lens, and
the top surface is spaced apart from the lens;
wherein the lens comprises an optical portion and a bearing portion disposed around the optical portion,
the bearing portion comprises an object-side surface close to the object side, an image side surface disposed opposite to the object-side surface, and a peripheral surface connecting the object-side surface and the image-side surface,
the lens barrel comprises a first abutting surface abutted against the peripheral surface, a second abutting surface abutted against the outer connecting surface, and an extending surface connecting the first abutting surface and the second abutting surface,
the extending surface extends from the first abutting surface towards the direction far away from the optical axis,
the image-side surface comprises a second surface extending from an edge of the peripheral surface towards the direction close to the optical axis, a third surface towards the object side along the direction close to the optical axis, and a fourth surface extending from an edge of the third surface close to the object side towards the direction close to the optical axis, and
the first surface is abutted against the second surface, the second side surface is abutted against the third surface, and the top surface is spaced apart from the fourth surface,
wherein a first shade is disposed between the pressing ring and the lens, the top surface is abutted against the first shade from the image side, and the fourth surface is abutted against the first shade from the object side.

2. The lens module according to claim 1, wherein the top surface and the fourth surface are vertical to the optical axis, one end of the fourth surface far away from the third surface is connected to the optical portion, and the first side surface is spaced apart from the lens.

3. The lens module according to claim 1, wherein the pressing ring is made of plastics, and the upper surface is smoothly connected in transition with the outer connecting surface.

4. The lens module according to claim 1, further comprising a shielding plate disposed at the object side of the lens.

5. The lens module according to claim 4, wherein a second shade is disposed between the lens and the shielding plate.

6. The lens module according to claim 4, further comprising a lens group disposed at an object side of the shielding plate, the lens group comprises at least five lenses stacked from the object side towards the image side, and the lens group is abut against the lens barrel from the image side.

* * * * *